United States Patent
Naota

(10) Patent No.: US 8,181,223 B2
(45) Date of Patent: May 15, 2012

(54) ELECTRONIC APPARATUS CONDUCTING TWO-PORT AUTHENTICATION, METHOD OF AUTHENTICATING AND RECEIVING JOB DATA, AN RECORDING MEDIUM CONTAINING JOB DATA AUTHENTICATION-RECEPTION PROGRAM

(75) Inventor: Tomonori Naota, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 1022 days.

(21) Appl. No.: 11/900,369

(22) Filed: Sep. 11, 2007

(65) Prior Publication Data

US 2008/0066154 A1    Mar. 13, 2008

(30) Foreign Application Priority Data

Sep. 13, 2006   (JP) ................................ 2006-247746

(51) Int. Cl.
*G06F 17/30*   (2006.01)

(52) U.S. Cl. ................ 726/2; 726/4; 713/176; 713/189; 380/30; 380/277

(58) Field of Classification Search .................. 726/2, 4; 713/176, 189; 380/30, 51, 55, 277, 282; 358/1.14, 3.28
See application file for complete search history.

(56) References Cited

U.S. PATENT DOCUMENTS

| | | | | |
|---|---|---|---|---|
| 6,019,281 | A * | 2/2000 | Emmett et al. | 235/375 |
| 7,443,527 | B1 * | 10/2008 | Shigeeda | 358/1.15 |
| 2002/0154333 | A1 | 10/2002 | Akashi | |
| 2004/0046973 | A1 * | 3/2004 | Sugahara et al. | 358/1.1 |
| 2009/0303540 | A1 | 12/2009 | Akashi | |

FOREIGN PATENT DOCUMENTS

| | | |
|---|---|---|
| JP | 2002-333958 | 11/2002 |
| JP | 2004-098375 | 4/2004 |
| JP | 2004-234313 | 8/2004 |
| JP | 2005-182248 | 7/2005 |
| JP | 2006-172292 | 6/2006 |

* cited by examiner

*Primary Examiner* — Kim Vu
*Assistant Examiner* — Baotran N To
(74) *Attorney, Agent, or Firm* — Jordan and Hamburg LLP

(57) ABSTRACT

The present invention provides an electronic apparatus such as a printer with a signal control port for authenticating a job and a job data port for receiving job data of the job authenticated via the signal control port. Namely, the job data port accepts job data of only an authenticated job.

12 Claims, 2 Drawing Sheets

ELECTRONIC APPARATUS CONDUCTING TWO-PORT AUTHENTICATION, METHOD OF AUTHENTICATING AND RECEIVING JOB DATA, AN RECORDING MEDIUM CONTAINING JOB DATA AUTHENTICATION-RECEPTION PROGRAM

BACKGROUND OF THE INVENTION

1. Field of the Invention

The present invention relates to an electronic apparatus such as a printer that collectively transmits and receives job data, and particularly, to an electronic apparatus that conducts an authentication process and transmits/receives data of only an authenticated job. The present invention also relates to a method of authenticating and receiving job data and a recording medium containing a job data authentication-reception program.

2. Description of Related Art

Needs for security functions for printers are increasing. Whenever printers transmit or receive print data, it is required to carry out authentication.

A related art for achieving the security of a printer sets print conditions for each port of the printer and asks a user to select proper ones from them, thereby allowing the user to easily control the printer. Another related art employs a printer server to set print conditions for ports of printers connected to the printer server. Each of these related arts assigns fixed conditions or attributes to each printer port, and therefore, is not always safe.

There is a related art that, when transmitting security-required data from an information terminal to a printer, encrypts the data and transmits the encrypted data to an encryption-dedicated port of the printer. When transmitting normal data, the related art transmits the data as it is to a normal port of the printer. Although the printer is provided with the encryption-dedicated port as a secure print port, this related art is unsafe because it allows every user to print any document (even if it is confidential) via the normal port of the printer.

There is another related art that employs a single port to carry out authentication and transmission/reception of job data. This related art has a problem that a job authentication must be suspended during transmission/reception of job data.

SUMMARY OF THE INVENTION

According to one aspect of the present invention, an electronic apparatus includes a signal control port having an authentication unit configured to authenticate a job through communication via the signal control port; and a job data port having a receiver configured to receive job data through communication via the job data port, the job data to receive being only of the job authenticated by the authentication unit.

According to this aspect of the present invention, the electronic apparatus can simultaneously carry out a challenge-response authentication on a new job without interrupting transmission/reception of job data.

The above and other objects, features, and advantages of the present invention will become more apparent upon reading of the following detailed description along with the accompanied drawings.

DETAILED DESCRIPTION OF EMBODIMENT

Figure 1:
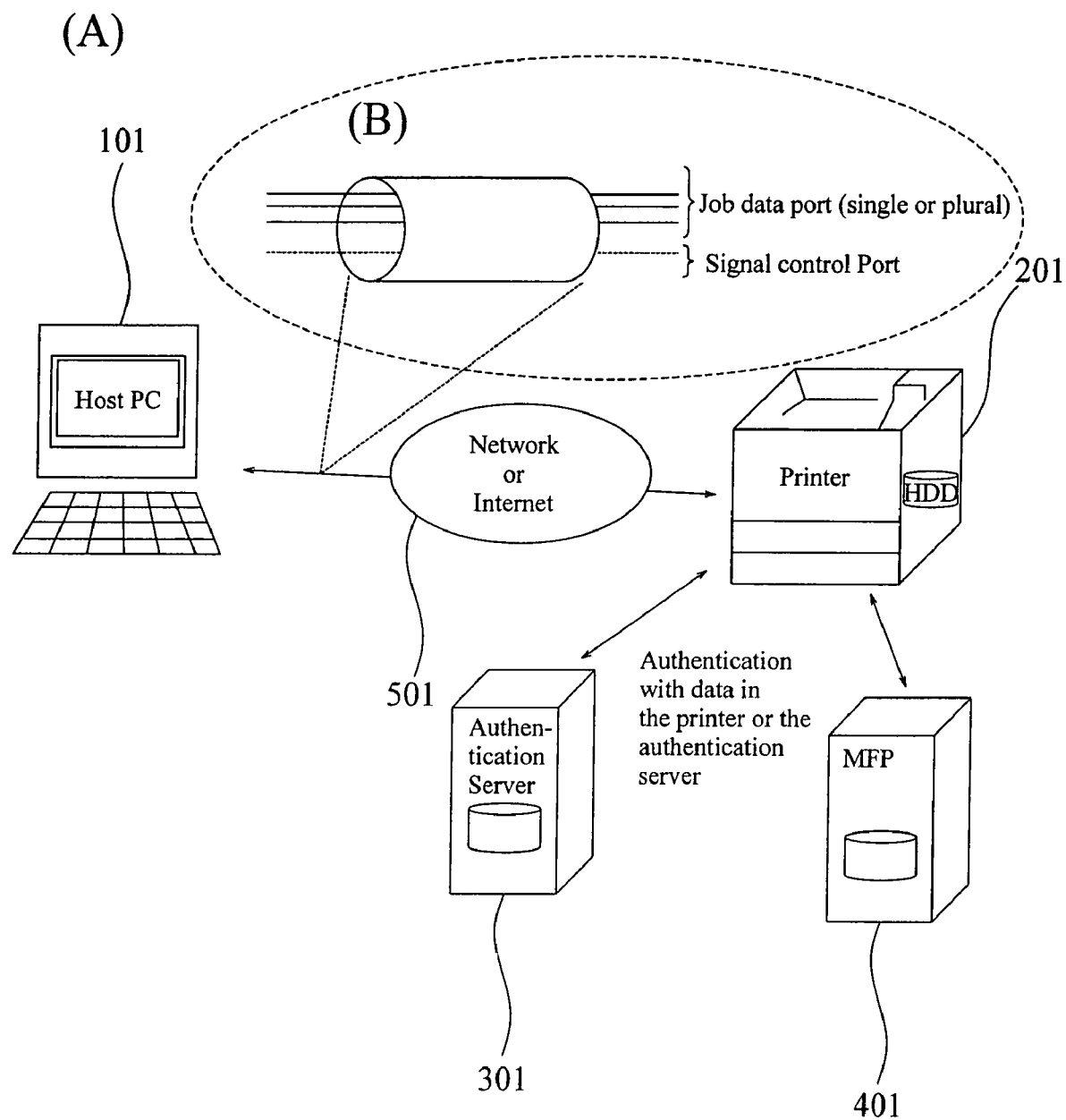
FIG. 1 is a block diagram showing a secure printing system including a printer according to an embodiment of the present invention.

An electronic apparatus employing a two-port authentication and encryption system according to an embodiment of the present invention will be explained. In this embodiment, the electronic apparatus is a printer connected to a host PC through a network.

It is known to provide a networked printer with logical ports and switch the logical ports from one to another. Based on this knowledge, the embodiment provides a printer with a job data port and a signal control port to realize authentication and data transmission/reception at the same time.

The job data port is an ordinary print port to handle data to print. The printer according to the embodiment may have a plurality of job data ports.

The signal control port is an essential part of the embodiment and is used to communicate information concerning authentication, permission, and encryption between the printer and a print request source such as a host PC.

The reason why the embodiment employs the two-port system will be explained.

Generally, a printer prints documents in units of jobs. To authenticate job data, a related art adds authentication information such as a user ID and a password in a text form to the job data. When the job data is received by a printer, the printer authenticates the job data according to the authentication information. Security of this related art is insufficient.

A more secure authentication technique is a challenge-response authentication technique that sequentially communicates authentication data. This technique is frequently employed by core server systems but it is improper for printers because printers collectively transmit and receive data.

In these circumstances, the present invention employs the two-port authentication and encryption system to ensure security of print data. The two-port system employs a concept of "session" in addition to "job."

The two-port system allows a printer to simultaneously carry out a printing operation and an authentication operation with the use of the job data port and signal control port.

Namely, to communicate signals concerning authentication, permission, and encryption with a print request source such as a host PC, the printer according to the embodiment of the present invention employs the two-port system.

To achieve authentication and permission by the printer alone, the printer according to the embodiment includes an HDD to form a user authentication database, and according to information in the database, carries out authentication and permission. User authentication/permission information is beforehand stored in the HDD of the printer through, for example, a web browser. Instead of the HDD, the printer may use a memory for managing the user authentication database in the case of a small-scale system.

A print request source such as a host PC sends print data with user authentication information to the signal control port of the printer. According to the authentication information, the printer conducts authentication and permission.

To achieve encryption and decryption, the printer according to the embodiment of the present invention may employ an encryption algorithm based on a generally adopted public key method. This is achievable because the printer according to the embodiment is separately provided with the signal control port to communicate control signals with a print request source such as a host PC. In practice, the printer according to the embodiment uses a hybrid encryption method based on a public-key-and-secret-key method and a common-key method.

A print request source sends authentication information to the signal control port of the printer, and once authenticated, sends print data with the authentication result to the job data port of the printer, to print the print data.

With these functions and advantages, the printer according to the embodiment allows a user to simply and economically use the high-level security system generally used by mission-critical core systems.

To achieve the present invention in a large-scale environment, an authentication server may be employed in coordination with various security techniques such as LDAP (Lightweight Directory Access Protocol) generally used in core systems.

[System Configuration]

FIG. 1A shows a print network system including the printer according to the embodiment of the present invention.

The system includes a host PC 101, the printer (electronic apparatus) 201, and a multifunctional peripheral (electronic apparatus) 401. The system may include an authentication server 301 for handling authentication of many users.

These components are connected to one another through a network 501 such as the Internet.

Communication between the host PC 101 and the printer 201 or between the host PC 101 and the multifunctional peripheral 401 is made through a signal control port and a print port (job information communication port), the signal control port and print port being separate from each other as shown in FIG. 1B. These ports are logical ports and actual physical network lines are not always separated like those shown in FIG. 1B.

The signal control port is used to communicate authentication protocols between the host PC 101 and the printer 201. If the host PC 101 is successfully authenticated, the printer 201 sets a job data port therein to receive a print job from the host PC 101.

[Operational Flow]

Operation of the printer according to the embodiment will be explained with reference to a sequence diagram of FIG. 2A.

A user who uses the security function of the printer according to the embodiment registers authentication information in the printer in advance. This registration is made by an administrator with the use of a web, control commands of PJL (Printer Job Language), or control commands of SNMP (Simple Network Management Protocol).

At this time, an encryption algorithm to use must be selected from among those installed in the printer.

Operation after the printer is turned on will be explained in detail with reference to FIG. 2A.

In step S1, an authentication unit at the signal control port of the printer generates a public key whenever the printer is turned on.

In step S2, the authentication unit of the printer generates a secret key that forms a pair with the public key generated in step S1. The secret key is managed only in the printer as a confidential item.

In step S3, the host PC uses a printer driver installed therein, to send a user name and an authentication request to the printer.

In step S4, the authentication unit at the signal control port of the printer receives the authentication request from the host PC and generates an MD5 code serving as a challenge code according to a serial number of the printer and the time of reception of the authentication request. The printer sends the challenge code to the host PC that has made the authentication request.

In step S5, the host PC generates a response code according to the challenge code received from the printer and a user password.

In step S6, the host PC sends the response code to the printer.

In step S7, the authentication unit at the signal control port of the printer generates a verification code according to the challenge code generated in step S4 and a user password stored in the printer in advance.

In step S8, the authentication unit of the printer checks to see if the response code received from the host PC in step S6 is identical to the verification code generated by the printer in step S7. If they agree with each other, the printer authenticates the user of the host PC and sends the public key to the host PC. Thereafter, steps from S9 are carried out. If the codes disagree with each other, the printer rejects the user of the host PC and terminates the process.

In step S9, the host PC generates a one-time common key according to a random number or the time of reception of the public key.

In step S10, the host PC encrypts the common key generated in step S9 with the public key received from the printer.

In step S11, the host PC sends the common key encrypted in step S10 to the printer.

In step S12, the authentication unit at the signal control port of the printer receives the encrypted common key, decrypts the same with the secret key, and keeps the common key. This is a hybrid encryption method.

In this way, the printer carries out steps S1 to S12 at the signal control port thereof. The authentication phase mentioned above is carried out according to PJL (Printer Job Language) commands usually used to control printers. It is possible to use other protocols such as SNMP (Simple Network Management Protocol) or web.

Thereafter, the printer carries out steps S13 to S17 at the job data port thereof.

In step S13, the host PC prepares print data and encrypts the print data with the common key.

Figure 2:
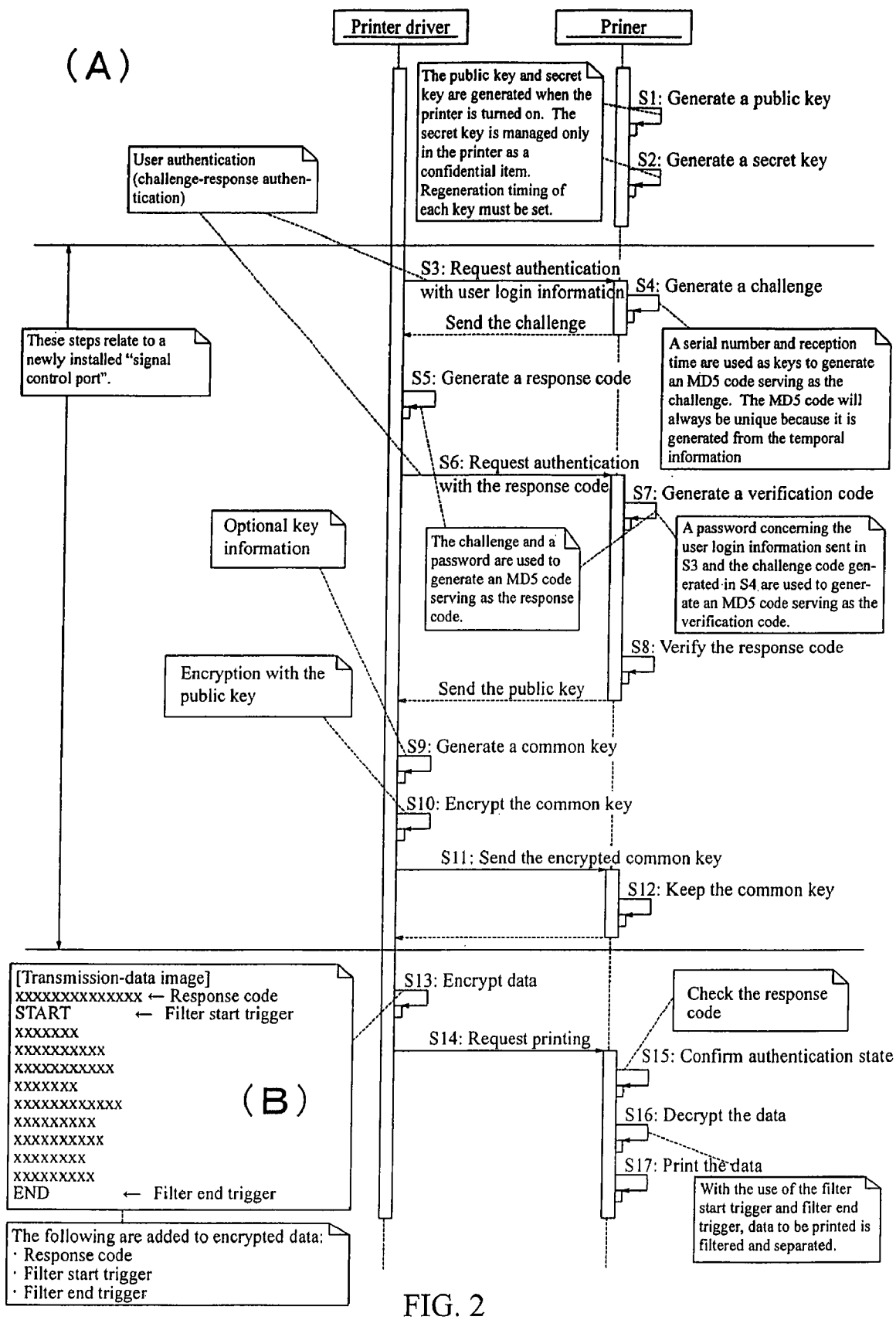
FIG. 2 is a sequence diagram showing protocols communicated between a printer and a host PC, according to an embodiment of the present invention.

As shown in FIG. 2B, the host PC adds the response code generated in step S5 to the head of transmission data (print data). As mentioned above, steps S1 to S12 and steps S13 to S17 are carried out at different logical ports of the printer. Accordingly, the host PC must add the response code to transmission data to confirm that the transmission data is of the user authenticated by the signal control port of the printer.

After the response code, the host PC inserts a filter start trigger ("START" in FIG. 2B) indicative of the start of print data, the encrypted print data, and a filter end trigger ("END" in FIG. 2B) at the end of the print data, thereby completing the transmission data.

In step S14, the host PC sends the transmission data prepared in step S13 to the printer.

In step S15, a receiver at the job data port of the printer receives the transmission data and checks the response code at the head of the transmission data to see if the data is from an authenticated user. If the data is not from an authenticated user, the printer discards the data and terminates the process. If the data is from an authenticated user, the printer carries out the next step.

In step S16, the receiver at the job data port of the printer uses the filter start trigger and filter end trigger to filter and separate the encrypted print data from the transmission data. With the use of the common key saved in step S12, the receiver decrypts the print data.

In step S17, the receiver at the job data port of the printer prints the print data decrypted in step S16.

In this way, the printer authenticates a user of a host PC so that only a user registered in the printer can use the printer to print documents.

Effect of the embodiment will be explained.

According to the embodiment, the logical port for authentication and the logical port for communication of print job (print data) are separate from each other in the printer, and therefore, the authentication port can authenticate a print request even while the print job port is processing a relatively large print job. Namely, a print request will not be queued for authentication until the completion of a print job in progress.

The printer incorporates authentication protocols. A user of a host PC sends a print request to the printer, and if the printer authenticates the user, the user sends print data to the printer. This procedure prevents a network apparatus faking a printer from stealing print data.

After authentication of a user of a host PC, communication between the host PC and the printer is carried out with encrypted data. This prevents print data from being stolen by the eavesdropping of a network between the host PC and the printer.

Instead of keeping authentication data, the printer may access an authentication server whenever user authentication is needed.

The embodiment mentioned above sends print data as job data to the printer. The present invention is applicable not only to sending print data to a printer but also to communicating any data with an electronic apparatus.

Although certain preferred embodiments of the present invention have been shown and described in detail, it should be understood that various changes and modifications may be made therein without departing from the scope of the appended claims.

What is claimed is:

1. An electronic apparatus comprising:
   a signal control port and a job data port, each of the ports being logical ports that are separated from each other;
   an authentication unit that authenticates a job through communication via the signal control port;
   a receiver that receives job data through communication via the job data port, the job data to be received being of the job authenticated by the authentication unit, said job data to be received by the receiver via the job data port being encrypted with a common key at a location of a sender of the job data; and
   the authentication unit generating a public key, a secret key and an authentication information, receiving a job authentication information from the sender via the signal control port and checking to see if the received job authentication information is identical to the generated authentication information, and if the received job authentication information and the generated authentication information are in agreement with each other, sending the sender the public key to encrypt the common key and receiving the encrypted common key from the sender via the signal control port so as to thereafter decrypt the encrypted common key with the secret key so as to allow the job data to be executed at the job data port.

2. The electronic apparatus of claim 1, wherein:
   the authentication unit authenticates a job according to authentication information selected from that stored in the electronic apparatus.

3. The electronic apparatus of claim 1, wherein:
   the authentication unit authenticates a job according to authentication information selected from that stored in an authentication server, the authentication information stored in the authentication server being obtainable through communication with the authentication server.

4. A method of authenticating a job and receiving job data, comprising:
   setting, in an electronic apparatus, a signal control port that is a logical port used for authentication and authenticating a job through communication via the signal control port;
   setting a job data port, the job data port being a logical port separated from the signal control port in the electronic apparatus and receiving, via the job data port, job data of the job authenticated via the signal control port, said job data to be received via the job data port being encrypted with a common key at a location of a sender of the job data; and
   in the electronic apparatus, generating a public key, a secret key and an authentication information, receiving a job authentication information from the sender via the signal control port and checking to see if the received job authentication information is identical to the generated authentication information, and if the received job authentication information and the generated authentication information are in agreement with each other, sending the sender the public key to encrypt the common key therewith and receiving the encrypted common key from the sender via the signal control port so as to thereafter decrypt the encrypted common key with the secret key so as to allow the job data to be executed at the job data port.

5. The method of claim 4, wherein:
   the signal control port authenticates a job according to authentication information selected from that stored in the electronic apparatus.

6. The method of claim 4, wherein:
   the signal control port authenticates a job according to authentication information selected from that stored in an authentication server, the authentication information stored in the authentication server being obtainable through communication with the authentication server.

7. A non-transitory recording medium storing an authentication-reception program that makes a computer execute:
   an authentication step of setting, in an electronic apparatus, a signal control port that is a logical port used for authentication and authenticating a job through communication via the signal control port; and
   a reception step of setting a job data port, the job data port being a logical port separated from the signal control port in the electronic apparatus and receiving, via the job data port, job data of the job authenticated via the signal control port, said job data to be received via the job data port being encrypted with a common key at a location of a sender of the job data; and
   in the electronic apparatus, generating a public key, a secret key and an authentication information, receiving a job authentication information from the sender via the signal control port and checking to see if the received job authentication information is identical to the generated authentication information, and if the received job authentication information and the generated authentication information are in agreement with each other, sending the sender the public key to encrypt the common key therewith and receiving the encrypted common key from the sender via the signal control port so as to thereafter decrypt the encrypted common key with the secret key so as to allow the job data to be executed at the job data port.

8. The recording medium of claim 7, wherein:
the authentication step authenticates a job according to authentication information selected from that stored in the electronic apparatus.

9. The recording medium of claim 7, wherein:
the authentication step authenticates a job according to authentication information selected from that stored in an authentication server, the authentication information stored in the authentication server being obtainable through communication with the authentication server.

10. An electronic apparatus comprising:
a signal control port and a job data port, each of the ports being logical ports that are separated from each other;
an authentication unit that authenticates a job through communication via only the signal control port;
a receiver that receives job data through communication via only the job data port, the job data to be received being of the job authenticated by the authentication unit, said job data to be received by the receiver via the job data port being encrypted with a common key at a location of a sender of the job data; and
the authentication unit generating a public key, a secret key and an authentication information, receiving a job authentication information from the sender via the signal control port and checking to see if the received job authentication information is identical to the generated authentication information, and if the received job authentication information and the generated authentication information are in agreement with each other, sending the sender the public key to encrypt the common key and receiving the encrypted common key from the sender via the signal control port so as to thereafter decrypt the encrypted common key with the secret key so as to allow the job data to be executed at the job data port.

11. A method of authenticating a job and receiving job data, comprising:
setting, in an electronic apparatus, a signal control port that is a logical port used for authentication and authenticating a job through communication via only the signal control port;
setting a job data port, the job data port being a logical port separated from the signal control port in the electronic apparatus and receiving, via only the job data port, job data of the job authenticated via the signal control port, said job data to be received via the job data port being encrypted with a common key at a location of a sender of the job data; and
in the electronic apparatus, generating a public key, a secret key and an authentication information, receiving a job authentication information from the sender via the signal control port and checking to see if the received job authentication information is identical to the generated authentication information, and if the received job authentication information and the generated authentication information are in agreement with each other, sending the sender the public key to encrypt the common key therewith and receiving the encrypted common key from the sender via the signal control port so as to thereafter decrypt the encrypted common key with the secret key so as to allow the job data to be executed at the job data port.

12. A non-transitory recording medium storing an authentication-reception program that makes a computer execute:
an authentication step of setting, in an electronic apparatus, a signal control port that is a logical port used for authentication and authenticating a job through communication via only the signal control port; and
a reception step of setting a job data port, the job data port being a logical port separated from the signal control port in the electronic apparatus and receiving, via only the job data port, job data of the job authenticated via only the signal control port, said job data to be received via the job data port being encrypted with a common key at a location of a sender of the job data; and
in the electronic apparatus, generating a public key, a secret key and an authentication information, receiving a job authentication information from the sender via the signal control port and checking to see if the received job authentication information is identical to the generated authentication information, and if the received job authentication information and the generated authentication information are in agreement with each other, sending the sender the public key to encrypt the common key therewith and receiving the encrypted common key from the sender via the signal control port so as to thereafter decrypt the encrypted common key with the secret key so as to allow the job data to be executed at the job data port.

* * * * *

UNITED STATES PATENT AND TRADEMARK OFFICE
CERTIFICATE OF CORRECTION

PATENT NO. : 8,181,223 B2
APPLICATION NO. : 11/900369
DATED : May 15, 2012
INVENTOR(S) : Tomonori Naota It is certified that error appears in the above-identified patent and that said Letters Patent is hereby corrected as shown below:

Title Page, Item (54) and at Column 1, lines 1-6, Title:

"ELECTRONIC APPARATUS CONDUCTING TWO-PORT AUTHENTICATION, METHOD OF AUTHENTICATING AND RECEIVING JOB DATA, AN RECORDING MEDIUM CONTAINING JOB DATA AUTHENTICATION-RECEPTION PROGRAM"

should read:

--ELECTRONIC APPARATUS CONDUCTING TWO-PORT AUTHENTICATION, METHOD OF AUTHENTICATING AND RECEIVING JOB DATA, AND RECORDING MEDIUM CONTAINING JOB DATA AUTHENTICATION-RECEPTION PROGRAM--

Signed and Sealed this
Thirtieth Day of October, 2012

David J. Kappos
*Director of the United States Patent and Trademark Office*